(12) United States Patent
Patel et al.

(10) Patent No.: US 7,305,654 B2
(45) Date of Patent: Dec. 4, 2007

(54) TEST SCHEDULE ESTIMATOR FOR LEGACY BUILDS

(75) Inventors: Madhu C. Patel, Wichita, KS (US); William W. Ecton, Augusta, KS (US)

(73) Assignee: LSI Corporation, Milpitas, CA (US)

( * ) Notice: Subject to any disclaimer, the term of this patent is extended or adjusted under 35 U.S.C. 154(b) by 576 days.

(21) Appl. No.: 10/667,010

(22) Filed: Sep. 19, 2003

(65) Prior Publication Data
US 2005/0066307 A1   Mar. 24, 2005

(51) Int. Cl.
*G06F 9/44* (2006.01)
(52) U.S. Cl. .......................................... 717/101; 705/9
(58) Field of Classification Search ................ 717/101, 717/124–127; 705/8, 9, 10; 709/223, 224, 709/229; 702/123; 714/1, 32, 35, 38, 46, 714/703, 738, 45; 707/102; 718/100; 719/315, 719/328; 348/402.1, 408.1; 382/209, 181, 382/219; 379/2, 22, 25, 26.01, 15.01, 27.01, 379/370
See application file for complete search history.

(56) References Cited

U.S. PATENT DOCUMENTS

| | | | | |
|---|---|---|---|---|
| 4,751,635 A * | 6/1988 | Kret | ............................ | 707/10 |
| 5,233,513 A * | 8/1993 | Doyle | ............................ | 705/7 |
| 5,629,770 A * | 5/1997 | Brassil et al. | .......... | 358/426.12 |
| 5,675,802 A * | 10/1997 | Allen et al. | ................. | 717/103 |
| 5,724,504 A * | 3/1998 | Aharon et al. | ................ | 714/33 |
| 5,729,746 A * | 3/1998 | Leonard | ..................... | 717/101 |
| 5,754,760 A * | 5/1998 | Warfield | ....................... | 714/38 |
| 5,758,061 A * | 5/1998 | Plum | ............................ | 714/35 |
| 5,805,795 A * | 9/1998 | Whitten | ....................... | 714/38 |
| 5,913,198 A * | 6/1999 | Banks | ....................... | 705/36 R |
| 5,930,798 A * | 7/1999 | Lawler et al. | .............. | 707/102 |
| 6,014,760 A * | 1/2000 | Silva et al. | .................... | 714/46 |
| 6,067,639 A * | 5/2000 | Rodrigues et al. | ............ | 714/38 |
| 6,088,770 A * | 7/2000 | Tarui et al. | ................. | 711/148 |
| 6,128,773 A * | 10/2000 | Snider | ......................... | 717/132 |
| 6,182,273 B1 * | 1/2001 | Tarumi | ....................... | 717/101 |
| 6,279,124 B1 * | 8/2001 | Brouwer et al. | ............. | 714/38 |
| 6,286,005 B1 * | 9/2001 | Cannon | ...................... | 707/100 |
| 6,314,555 B1 * | 11/2001 | Ndumu et al. | .............. | 717/101 |
| 6,343,285 B1 * | 1/2002 | Tanaka et al. | .............. | 705/400 |
| 6,405,364 B1 * | 6/2002 | Bowman-Amuah | ......... | 717/101 |
| 6,408,403 B1 * | 6/2002 | Rodrigues et al. | ............ | 714/38 |
| 6,438,743 B1 * | 8/2002 | Boehm et al. | .............. | 717/122 |
| 6,502,102 B1 * | 12/2002 | Haswell et al. | ............. | 707/102 |
| 6,513,154 B1 * | 1/2003 | Porterfield | ................. | 717/101 |
| 6,519,763 B1 * | 2/2003 | Kaufer et al. | ............... | 717/101 |
| 6,546,506 B1 * | 4/2003 | Lewis | ......................... | 714/38 |
| 6,550,057 B1 * | 4/2003 | Bowman-Amuah | ......... | 717/126 |
| 6,601,233 B1 * | 7/2003 | Underwood | ................ | 717/102 |

(Continued)

OTHER PUBLICATIONS

Software Project Cost 7 Schedule Estimating, William H. Roetzheim et al, 1998, Whole book.*

(Continued)

*Primary Examiner*—Todd Ingberg
(74) *Attorney, Agent, or Firm*—Yee & Associates (57) ABSTRACT

A test schedule estimator for performing fixes on released software. In a preferred embodiment, historic data from similar builds are used with other data to estimate a time required to perform testing and release based on the number of fixes implemented.

17 Claims, 5 Drawing Sheets

U.S. PATENT DOCUMENTS

| | | | |
|---|---|---|---|
| 6,636,585 B2 * | 10/2003 | Salzberg et al. | 379/22 |
| 6,658,643 B1 * | 12/2003 | Bera | 717/101 |
| 6,662,357 B1 * | 12/2003 | Bowman-Amuah | 717/120 |
| 6,675,149 B1 * | 1/2004 | Ruffin et al. | 705/8 |
| 6,678,355 B2 * | 1/2004 | Eringis et al. | 379/22 |
| 6,701,514 B1 * | 3/2004 | Haswell et al. | 717/115 |
| 6,715,130 B1 * | 3/2004 | Eiche et al. | 715/514 |
| 6,718,535 B1 * | 4/2004 | Underwood | 717/101 |
| 6,725,399 B1 * | 4/2004 | Bowman | 714/38 |
| 6,745,384 B1 * | 6/2004 | Biggerstaff | 717/156 |
| 6,772,083 B2 * | 8/2004 | Muller et al. | 702/123 |
| 6,775,680 B2 * | 8/2004 | Ehrman et al. | 707/102 |
| 6,775,824 B1 * | 8/2004 | Osborne et al. | 717/125 |
| 6,785,805 B1 * | 8/2004 | House et al. | 713/1 |
| 6,842,891 B2 * | 1/2005 | Zhang et al. | 717/101 |
| 6,859,768 B1 * | 2/2005 | Wakelam et al. | 703/1 |
| 6,907,546 B1 * | 6/2005 | Haswell et al. | 714/38 |
| 6,934,934 B1 * | 8/2005 | Osborne et al. | 717/126 |
| 6,944,606 B2 * | 9/2005 | Schmit et al. | 706/60 |
| 6,959,433 B1 * | 10/2005 | Morales et al. | 717/127 |
| 6,970,803 B1 * | 11/2005 | Aerdts et al. | 702/179 |
| 6,978,446 B2 * | 12/2005 | Archambeault et al. | 717/132 |
| 6,996,811 B2 * | 2/2006 | Nishioka et al. | 717/135 |
| 7,000,224 B1 * | 2/2006 | Osborne et al. | 717/125 |
| 7,024,589 B2 * | 4/2006 | Hartman et al. | 714/32 |
| 7,080,351 B1 * | 7/2006 | Kirkpatrick et al. | 717/102 |

OTHER PUBLICATIONS

Productive Objects An Applied Software Project Management Framework, Robert J. Muller, Aug. 1997, pp. 613-698.*

Software Engineering Economics, Barry W. Boehm, published Oct. 20, 1981, pp. 35-55, 532-555, 591-638.*

Continuus Software Corporation, Change Management Software Development, Problem Tracking Task Reference, Whole Manual, 1996.*

A First Course In Business Statistics, Fifth Edition, James T. Mc Clave et al, 1992, pp. 268-272.*

"Software Engineering", 6$^{th}$ Edition, Addison Wesley, Ian Sommerville, 2000, pp. 511-533.*

Software Requirements, Microsoft Press, Karl E. Wiegers, 1999, pp. 258-259.*

"On Tine Within Budget Software Project Management Practices and Techniques", E.M. Bennatan, 1992, pp. 1-43, 162-195.*

COCOMO II Model Definition Manual, Barry Boehm et al, 1998, Whole Manual.*

* cited by examiner

| SYMsm 7/4.x/8/5.x | | Unique TC | TC/Eng | FTE Eng | test wks (Calendar) | Eng wks (Calendar) | test cases/ Cal-Wk | test cases/ tester-wk |
|---|---|---|---|---|---|---|---|---|
| | | | | | | | Test Execution Factors | |
| G1 | Overall Viking 1 | 199 | 22 | 9 | 29 | 32.22 | 0.76 | 0.69 |
| G1 | Overall Viking 2 | 188 | 19 | 10 | 27 | 33.08 | 0.7 | 0.57 |
| G2 | Overall Viking 3 | 421 | 38 | 11 | 24 | 30 | 1.59 | 1.28 |
| G1 | Overall Mojave 1-Tier 1 | 190 | 16 | 12 | 23 | 28.27 | 0.69 | 0.56 |
| G2 | Overall Sonoran 1 (8.0/5.0) | 194 | 24 | 8 | 12.2 | 15.25 | 1.99 | 1.59 |
| G3 | Overall Mojave 2-Solaris 8/W2K | 119 | 40 | 3 | 7.58 | 8.21 | 5.23 | 4.83 |
| G3 | Sonoran 1M Regression (120 PRs) | 83 | 46 | 1.8 | 10 | 11.11 | 4.61 | 4.15 |

*FIG. 5*

Schedule in Weeks

| PRs | Aggressive | 70% Confidence | High Confidence |
|---|---|---|---|
| 1 | 0.42 | 0.51 | 0.62 |
| 2 | 0.52 | 0.62 | 0.76 |
| 3 | 0.61 | 0.73 | 0.90 |
| 4 | 0.70 | 0.84 | 1.03 |
| 5 | 0.79 | 0.95 | 1.16 |
| 10 | 1.22 | 1.46 | 1.78 |
| 15 | 1.64 | 1.96 | 2.39 |
| 20 | 2.04 | 2.44 | 2.98 |
| 25 | 2.44 | 2.92 | 3.56 |
| 30 | 2.83 | 3.38 | 4.13 |
| 35 | 3.22 | 3.85 | 4.69 |
| 40 | 3.60 | 4.31 | 5.25 |
| 45 | 3.98 | 4.76 | 5.81 |
| 50 | 4.36 | 5.21 | 6.36 |
| 55 | 4.73 | 5.66 | 6.90 |
| 60 | 5.10 | 6.10 | 7.44 |
| 65 | 5.47 | 6.55 | 7.98 |
| 70 | 5.84 | 6.99 | 8.52 |
| 75 | 6.21 | 7.42 | 9.05 |
| 80 | 6.57 | 7.86 | 9.59 |
| 85 | 6.93 | 8.29 | 10.11 |
| 90 | 7.30 | 8.72 | 10.64 |
| 95 | 7.66 | 9.16 | 11.17 |
| 100 | 8.01 | 9.58 | 11.69 |
| 105 | 8.37 | 10.01 | 12.21 |
| 110 | 8.73 | 10.44 | 12.73 |
| 115 | 9.08 | 10.86 | 13.25 |
| 120 | 9.44 | 11.28 | 13.76 |
| 125 | 9.79 | 11.71 | 14.28 |

TEST SCHEDULE ESTIMATOR FOR LEGACY BUILDS

BACKGROUND OF THE INVENTION

1. Technical Field

The present invention is directed generally toward a method and apparatus for servicing software, and particularly toward estimating software maintenance schedules.

2. Description of the Related Art

Regression testing is the process of selective retesting of a software system that has been modified to ensure that any defects have been fixed and that no other previously working functions have failed as a result of the fixes implemented. Some current regression testing is done in two phases—pre-release phase and legacy release phase. The pre-release phase (a separate test group) addresses the "dead on arrival" and functional issues of the builds by performing BST (basic stability test) and NFT (minimal functionality test) testing. The pre-release testing process for controller firmware has pre-defined test processes that do not change from build to build. Thus, once the build is available then the pre-release schedule is relatively fixed. The set of tests are pre-defined for each type of build and does not change from build to build testing.

The legacy release phase is typically done by a separate test group. The test process is based on executing a set of tests that varies in number depending on the number of fixes, types of module(s) affected by the defect, and severity class of the defects fixed in the build. Thus, the test cycle time varies from build to build. However, it would be advantageous to know, in order to prioritize legacy team resources, how long it would take for a build to pass through the release cycle. Further, since newly released software may not have historic data from which to draw, it would be advantageous to have an estimate of required testing time for a build based on data gathered from similar products and based on the number of problem reports received.

SUMMARY OF THE INVENTION

In a preferred embodiment, the present invention discloses a system and method for estimating test and release time for fixes on software. Though the present invention is particularly applicable to legacy releases of controller firmware, it is not limited to such application and can be implemented in a number of other software repair circumstances. In a preferred embodiment, the current innovations include estimating the schedule based on the number of problem reports (PRs) and based on historic data from similar programs. Particularly, in a preferred embodiment, the number of problem reports is used to calculate the number of test cases, and this factor is modified using historic data and data relating to the resources capable of being dedicated to the schedule.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
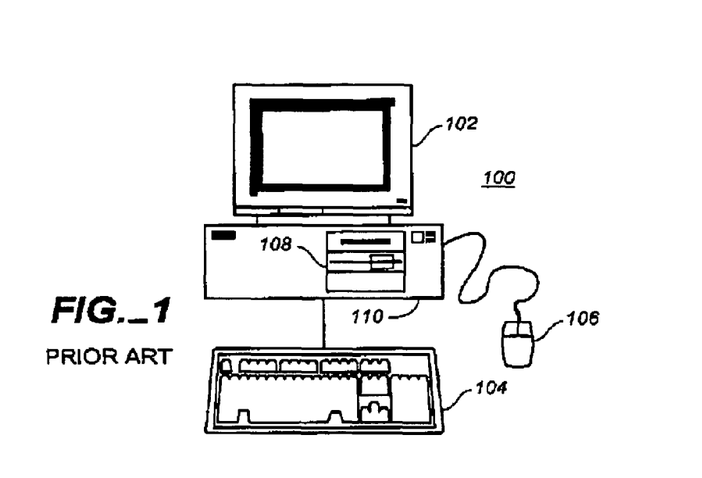
FIG. 1 is a diagram of a computer system on which preferred embodiments of the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
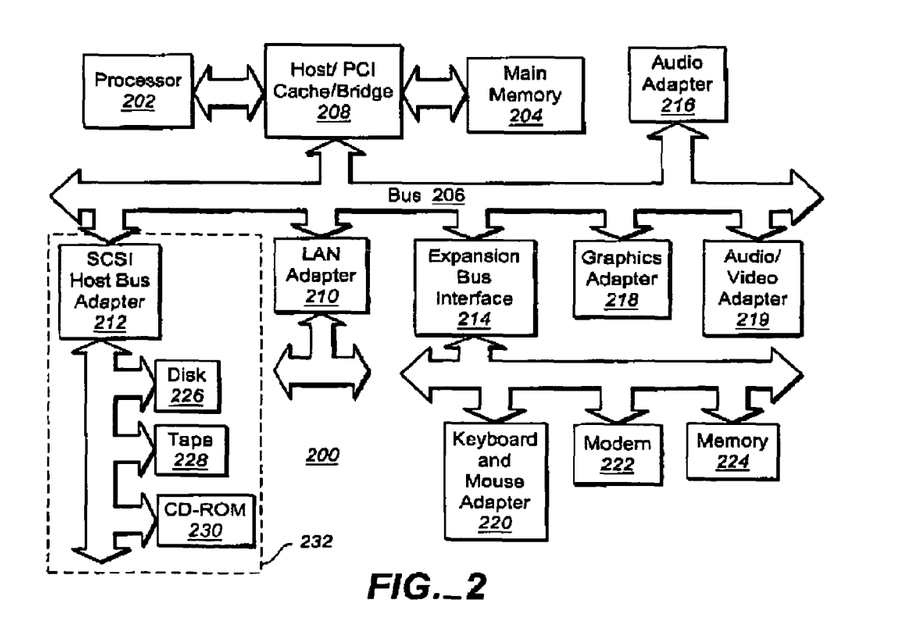
FIG. 2 shows a diagram of the functional parts of the computer system of FIG. 1.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object-oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The premise of the method and apparatus described herein is based on historical data of similar testing done on products similar to the legacy builds. The modeling of the present invention can be applied to other systems where past data can be modified to predict the needs of the future. The present innovations are based on the idea that the estimate for the current build can be made by looking at historical data for similar software products (in examples for the preferred embodiments) and using that information to create an estimate for a future test that has not been run yet.

Figure 3:
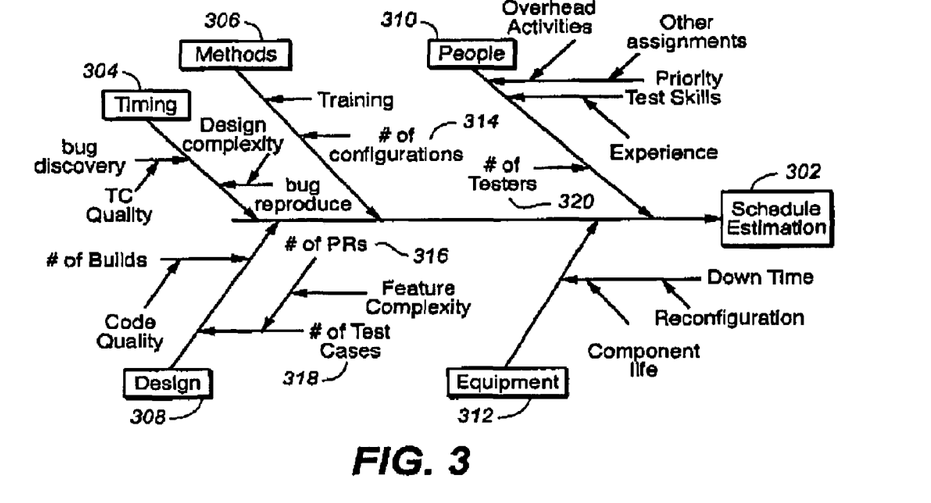
FIG. 3 shows a tree of variables considered in the schedule estimation of a preferred embodiment of the present invention.

In a preferred embodiment, the present invention is applied to released builds (i.e., software versions) that require maintenance fixes. The process is defined for a "Legacy Team" engaged in regression testing of software, for example, controller firmware. Such builds are expected to require few changes and therefore are expected to have quicker turn around time to release. The driving process variable of the schedule is the ability to perform a number of test cases in a given time, such as test cases/calendar week. FIG. 3 shows the process variables that influence the outcome of schedule variation of a testing environment. A test schedule depends on how may test cases (TCs) are performed and the rate of executing the TCs for a given build. Different software packages can require different times for executing a TC. For legacy releases, testing parameters such as number of problem reports (PRs), number of TCs, number of configurations, and number of available testers have large influence over the outcome of the schedule estimation. There are other variables too as shown in FIG. 3, which do not greatly influence the outcome of the schedule estimation. These other variables, as described below, are preferably combined into a single Test Executing Factor (TEF) that represents the capability of test execution, efficiency, and improvements in the test organization.

FIG. 3 shows a variable tree showing what variables contribute to the estimate of the schedule length 302. Primary variable groups include timing 304, methods 306, design 308, people 310, and equipment 312. Within each of these groupings are several variables. Most of these variables are lumped together in a preferred embodiment and incorporated in the Test Execution Factor. Among these variables, the most influential are the number of PRs 316, the number of test cases 318, and the number of testers 320. For example, in one embodiment, the number of full-time equivalent engineers or the number of test configurations available (whichever is smaller) determines parallel test capability of a team.

In a preferred embodiment, the present invention teaches an approach to testing estimation that defines a methodology to estimate the testing and release time required for software based on the number of fixes implemented (such as problem reports) in a legacy build of, for example, controller firmware. The strategy to define a process to forecast schedules based on PRs is preferably done in two parts. First the conversion factor is derived for calculating the number of test cases required for maintenance based on the number of PRs received for the build. If data from past projects of this build are not available, it is preferably based on data from similar projects. In this example, the Sonoran 1M project is used for the estimate. In regression testing, test cases are written to address the side effect of fixes. Thus, in legacy builds, it is expected that if a build has fewer PRs then it would require one or more TCs per PR; however, with large numbers of PRs in a build, the cumulative number of TCs will be less than the cumulative number of PRs. The reason for this is that as the number of PRs increases, fewer TCs are required because of overlapping and shotgun test coverage effect.

Figure 4:
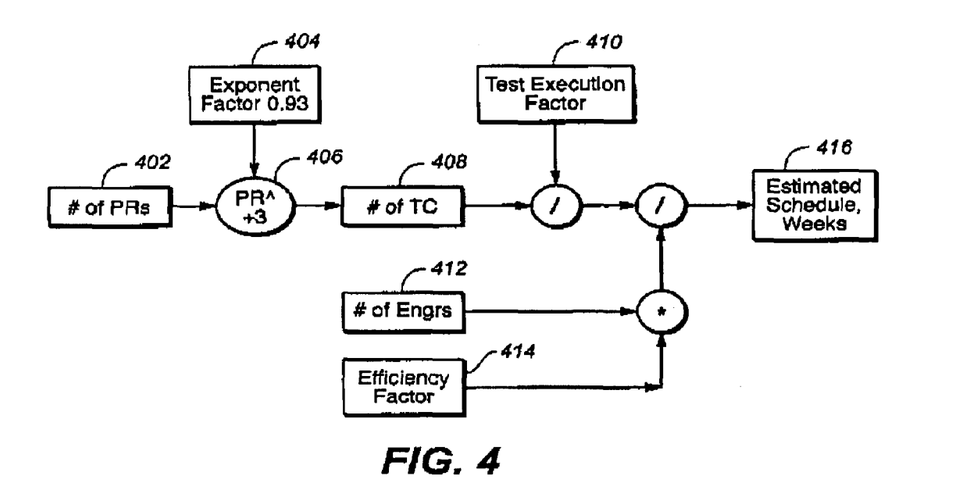
FIG. 4 shows the parametric relation of the schedule estimating equations consistent with a preferred embodiment.

This fact is expressed in the equation for the schedule estimate of FIG. 4, as the exponent factor. A constant is also added (preferably +3) to establish a minimum number of tests required due to the three controller types. This factor can be adjusted with the controller types, as described below.

Figure 5:
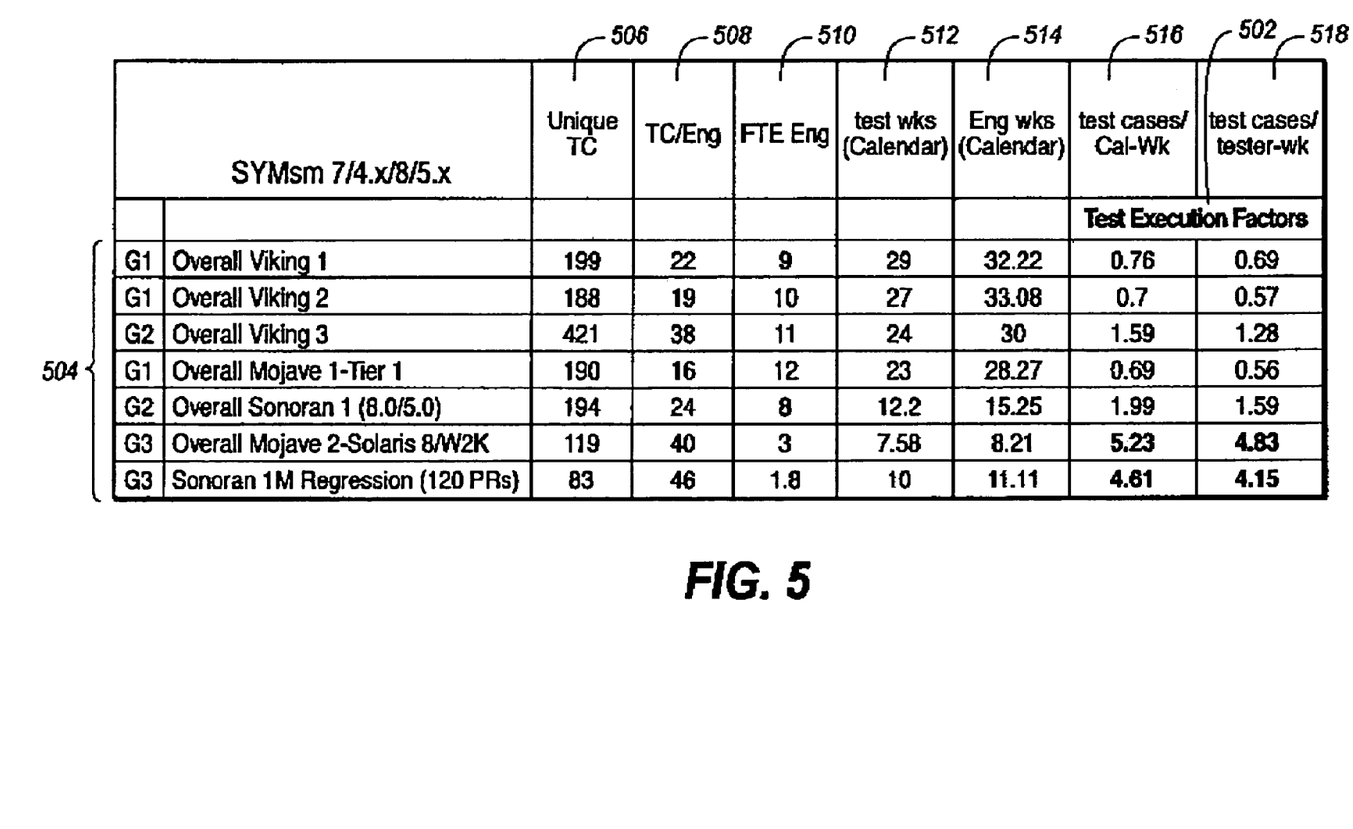
FIG. 5 shows a table of historic data consistent with a preferred embodiment of the present invention.

The second part of the forecast is done by reviewing the results of similar projects from the past. The metric test cases/calendar week or TEF is chosen since it exhibits invariance to parameters such as number of TCs, testers (or number of test configurations, whichever is smaller), and length of schedule for a given test environment. FIG. 5 shows the historical average TEF values of three groups (G1, G2, G3) in the range of 0.72, 1.79, and 4.92. These TEFs are the average of each group.

The following discussion is based on taking the examples from line item G1 of FIG. 5: The table in FIG. 5 shows historical data of the testing of several projects. Projects of similar complexity and design are groups and labeled as G1, G2, G3, etc. The relevant data for each project include (1) number of test cases (TC) 506, (2) full time equivalent entineers (FTE) 510, (3) test weeks 512, or the total time the project took in weeks, (4) eng. weeks 514 reflects over-time FTE for the projects, such as when they exceed 40 hours.

These values are used to derive the other information. In a preferred embodiment, a relation of these parameters is formed (which can vary from project to project) in a single entity TEF (test cases/cal-week 516) parameter which we believe has invariant characteristics with respect to the other parameters. The relation, in a preferred embodiment, follows: TEF is directly proportional to Unique TC 506 and inversely proportional to the product FTE 510 and test weeks 512 of the project. The differences in items in column 518 and 516 tell the efficiency factor by averaging the differences for each group and taking the ratio of each TEF. In the example group, G1 average TEF is 0.72 and the average difference of column 518 and 516 is 0.11. Therefore, 0.11/0.72 is 15%. The range for these calculations has been shown to vary in value between 8% and 30%. This fives data points to calculate the schedule with different confidence levels. Hence, efficiency factors or 1, 0.8, and 0.7 are used in preferred calculations. The TEF values from this historical data are used in the equation of FIG. 4.

The model is based on the number of fixes implemented and the distribution of severity types, and on the past data from similar testing. These values are used to derive the constants of the parametric equation. The equation of FIG. 4 preferably comprises two different expressions incorporating these derived constants. The constants include, in a preferred embodiment, the following:

Exponent Factor: Conversion for PRs to TC (derived from historical and current test data)

Efficiency Factor: Resource use (derived from past data)

Test Execution Factor: TC/Calendar week (derived from past data)

These values depend on the type of program, and the aggressiveness of the estimate—i.e., whether it is aggressive or high confidence, for example.

The equations used in the equation of FIG. 4 preferably include the following:

$$\#of\ TCs = [(\#PRs \hat{}\ Exp\ Factor) + 3]$$

and $$Estimated\ Weeks = [(\#TCs/TEF)/(\#engineers * Efficiency\ Factor)]$$

These equations are combined in FIG. 4 to derive the parametric relation of schedule estimation equation. Note that this equation estimates the required schedule for maintenance based on historic data from similar programs and the number of PRs received, and is not based on the number of TCs from previous fixes of the same program. The equation is expressed as a block diagram showing the functions performed on the variables. First, # of PRs 402 is raised to an exponent factor 404 (0.93 in an example embodiment) and three is added. The exponent factor reflects the trend of decreasing TCs required per PR as number of PRs increases. The addition of 3 (406) to this value is intended to reflect a minimum number of TCs. These operations produce the # of TCs 408. Historical data is incorporated in the model using the Test Execution Factor (TEF) 410. This factor includes historic data, as shown from FIG. 5. As more data is gathered, this factor can change to better reflect the consensus gathered form previous tests and to incorporate data from previous tests into the current model. The TEF 410 preferably changes with each type of program, preferably within groups of similar programs—i.e., there is preferably a TEF for each group of similar programs. There can also be a TEF for each previous version of an individual program if such data is available. TEF is incorporated into the model of FIG. 4 by dividing the number of TCs 408 by the TEF 410.

This resultant is then divided by the product of the number of engineers assigned to perform testing 412 and the efficiency factor 414. The result is the new schedule 416, in units of weeks.

FIG. 5 shows historical data that is used to derive two Test Execution Factors 502, expressed in terms of test cases per calendar week or test cases per tester week. Different groups 504 are shown in the left hand column, where a group indicates a type of program or groups of programs that share similar attributes. In a preferred embodiment, historic data from a similar group is used where actual data from the individual program being tested is unavailable. The table of FIG. 5 includes multiple factors, indicated by columns 506-514. Data for each group 504 is indicated in the relevant columns 506-514. Data from columns 506-514 is used to calculate the TEF 502. In the case where the units of test cases per calendar week are used, the TEF is indicated by dividing the value 506 by the product of the values of 510 and 512. In the case where the units of test cases per tester week are used, the TEF is indicated by dividing the value 506 by the product of the values of 510 and 514. These values are chosen from the table by matching the currently tested software with a group of the table, preferably a group of similar programs.

In a preferred embodiment, the equation of FIG. 4 can be set in a spreadsheet or other calculator to generate a table that depicts the estimated schedule for number of PRs as an independent variable. The table of FIG. 6 is the result of using constants defined from the table of FIG. 5. the model can also be used to get a rough estimate of the schedule if the number of TCs are known for a program type and using constants of similar program types.

Figure 6:
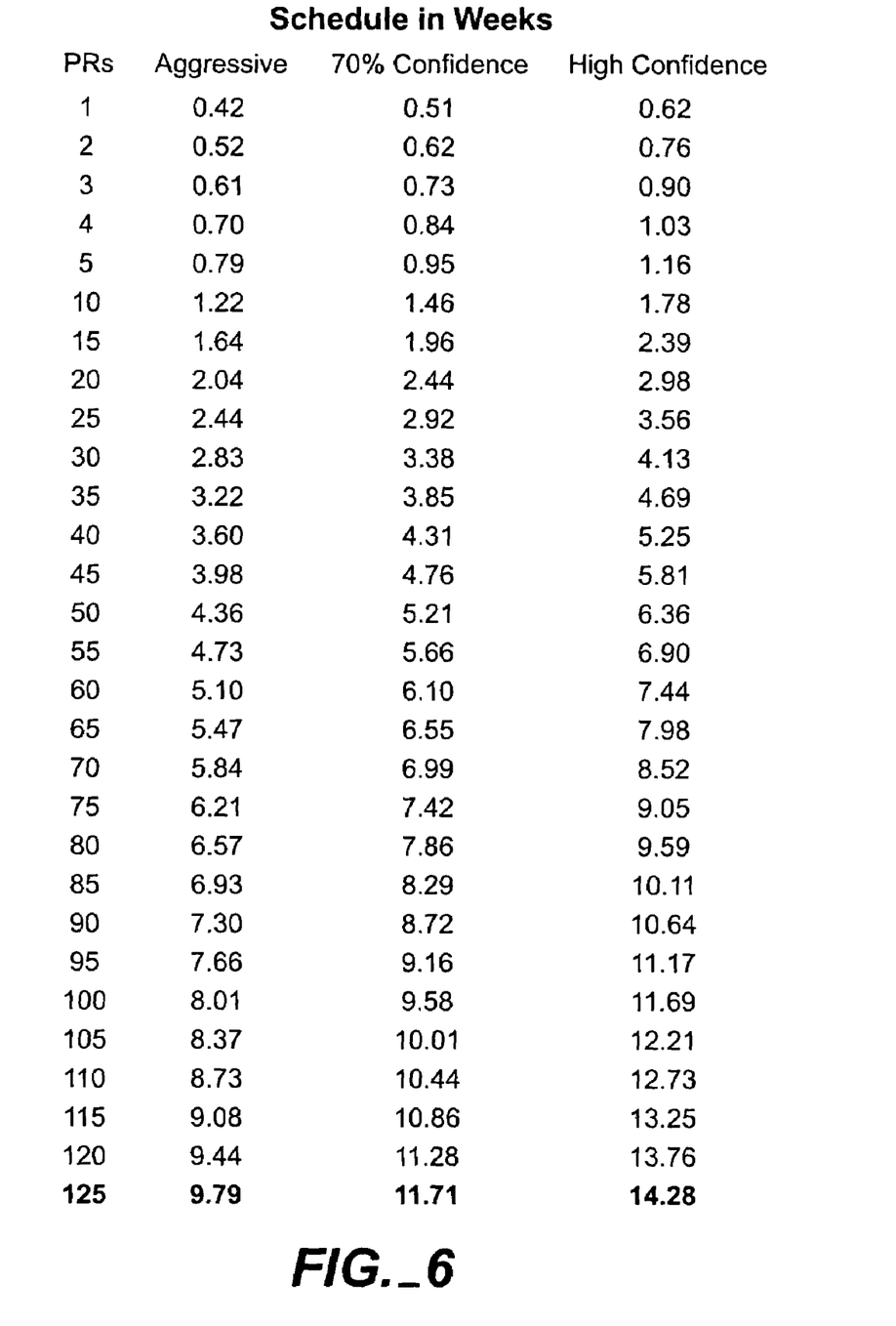
FIG. 6 shows a derived schedule, in weeks, according to number of problem reports received, consistent with a preferred embodiment of the present invention.
Figure 7:
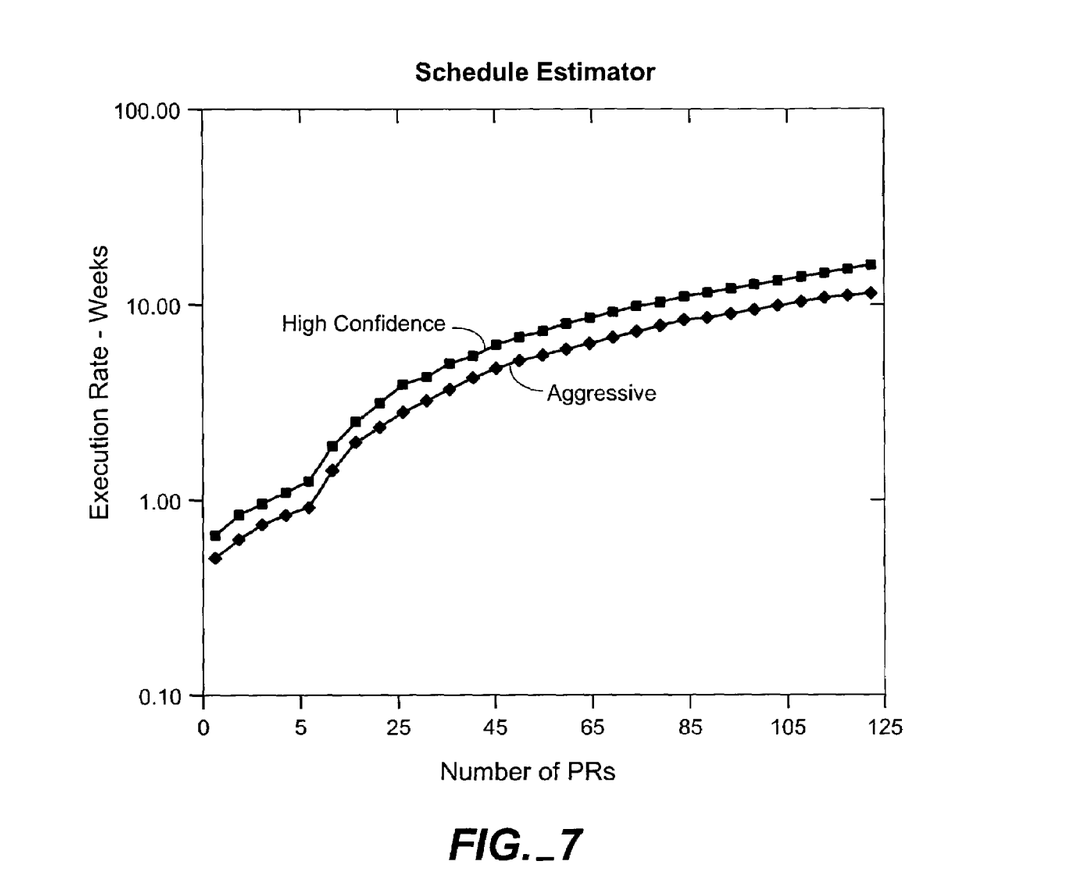
FIG. 7 shows a plot of the schedule estimator results, consistent with a preferred embodiment.

FIG. 6 shows the number of PRs and three different estimates, derived from the equation of FIG. 4. 'Aggressive' is the lowest confidence and the shortest test time estimate. 'High confidence' is the longest estimate. These results are tabulated per number of PRs received for the build. This data is charted in FIG. 7 in graphic form.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A computer implemented method executed to estimate the time required for testing specified software, comprising the steps of:

determining a preliminary number of test cases as a function of a number of received problem reports for the specified software; and modifying the preliminary number of test cases using historic data from software projects similar to said specified software to provide an estimate of said required time.

2. The method of claim 1, wherein the step of determining a number of test cases includes raising the number of received problem reports to an exponent less than one, and then adding a number thereto.

3. The method of claim 1, wherein the historic data is combined into a Test Execution Factor used to modify the preliminary number of test cases to provide said estimate of said required time.

4. The method of claim 1, wherein the steps of determining and modifying are performed on an information processing system.

5. A method for providing an estimated time schedule for testing specified software, said method comprising operating a data processing system to perform the steps of:
   determining a preliminary number of test cases from a prespecified relationship between said number of test cases, and a number of received problem reports for the specified software;
   scaling the preliminary number of test cases by a first factor to produce a first result, wherein the first factor is derived from historic data from software projects similar to said specified software; and
   scaling the first result by a second factor to produce an estimated time.

6. The method of claim 5, wherein the step of determining a number of test cases includes raising the number of received problem reports to an exponent less than one, and then adding a number thereto.

7. The method of claim 5, wherein the historic data is combined into a Test Execution Factor used to modify the preliminary number of test cases to produce said estimated time.

8. The method of claim 5, wherein the second factor is derived from data including the amount of resources dedicated to testing the software.

9. The method of claim 5, wherein the steps of determining a number of test cases, scaling the number of test cases, and scaling the first result are performed on an information processing system.

10. In a data processing system, apparatus for estimating the time required for testing software, said apparatus comprising:
    a first processing component for determining a number of test cases as a function of first data indicating the number of problem reports received for the specified software;
    a second processing component for scaling the number of test cases by historic data to produce a scaled number of test cases;
    a third processing component for scaling the scaled number of test cases by second data indicating the amount of resources dedicated to testing the number of test cases; and
    a component for selectively storing said second data indicating said amount of dedicated resources.

11. The apparatus of claim 10, wherein the number of test cases is determined by raising the first data to an exponent less than one, and then adding a number thereto.

12. The apparatus of claim 10, wherein the historic data is gathered from testing of software similar to the specified software.

13. In an information processing system, a computer program product in a computer readable medium for providing an estimated time schedule for testing specified software, said computer program product comprising:
    computer readable instructions for determining a preliminary number of test cases as a function of a number of received problem reports for the specified software;
    computer readable instructions for scaling the preliminary number of test cases by a first factor to produce a first result, wherein the first factor is derived from historic data from software projects similar to said specified software;
    computer readable instructions for scaling the first result by a second factor to produce an estimated time; and
    computer readable instructions for selectively storing said estimated time.

14. The computer program product of claim 13, wherein the step of determining a number of test cases includes raising the number of received problem reports to an exponent less than one, and then adding a number thereto.

15. The computer program product of claim 13, wherein the historic data is combined into a Test Execution Factor used to modify the preliminary number of test cases to produce said estimated time.

16. The computer program product of claim 13, wherein the second factor is derived from data including the amount of resources dedicated to testing the software.

17. The computer program product of claim 13, wherein the steps of determining a number of test cases, scaling the number of test cases, and scaling the first result are performed on an information processing system.

* * * * *